United States Patent [19]

Pierpont

[11] 4,377,548
[45] Mar. 22, 1983

[54] METHOD FOR ENCAPSULATING A RADIAL LEADED ELECTRICAL COMPONENT

[75] Inventor: Ralph E. Pierpont, Kennebunk, Me.

[73] Assignee: Sprague Electric Company, North Adams, Mass.

[21] Appl. No.: 325,464

[22] Filed: Nov. 27, 1981

[51] Int. Cl.³ .............................................. B29C 6/04
[52] U.S. Cl. ............................... 264/265; 264/272.15; 264/272.18; 264/278
[58] Field of Search .............. 264/265, 272.15, 272.16, 264/272.17, 272.18, 272.14, 278

[56] References Cited

U.S. PATENT DOCUMENTS 3,044,127 7/1962 Alden .............................. 264/272.18
3,436,610 4/1969 Sparrow et al. ............... 264/272.18

FOREIGN PATENT DOCUMENTS 872521 7/1961 United Kingdom ........... 264/272.17

*Primary Examiner*—James B. Lowe

[57] ABSTRACT

A large multi-cavity mold is loaded with a plurality of horizontal radially leaded capacitors. The closed mold grips the leads. A top knock-out pin pushes each component body downward a predetermined degree so that all the bodies are left in about the same position within the corresponding mold cavity. A bottom knock-out pin then pushes each component body upward only slightly above the cavity center so that upon its withdrawal, the programmed lead wire stresses cause the bodies to spring back just to the mold cavity center position. Molding resin is then introduced into the cavities. The incidence of show-throughs is greatly reduced.

7 Claims, 6 Drawing Figures

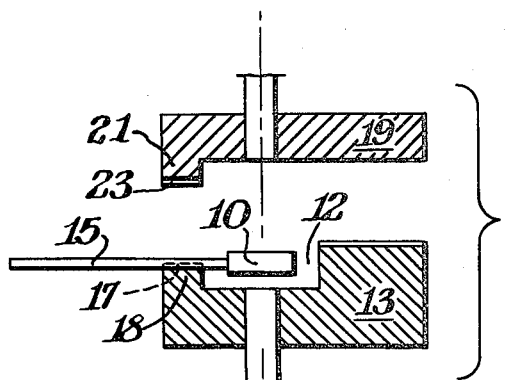
Fig. 1.
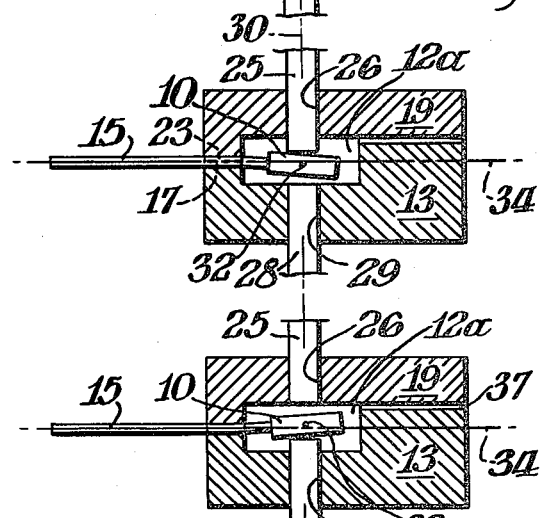
Fig. 2.
Fig. 3.
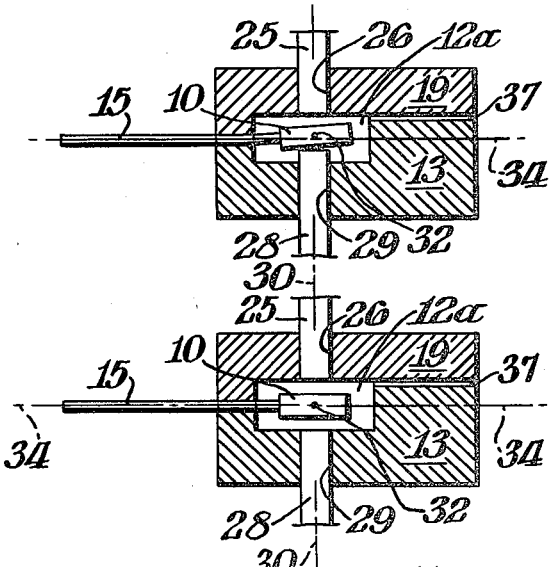
Fig. 4.
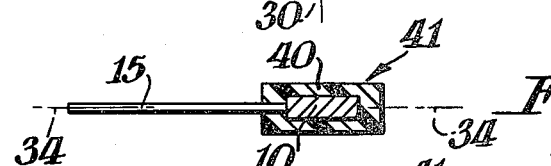
Fig. 5.
Fig. 6.

METHOD FOR ENCAPSULATING A RADIAL LEADED ELECTRICAL COMPONENT

BACKGROUND OF THE INVENTION

This invention relates to a method for molding radial leaded electrical components and more particularly to novel steps for using knock-out pins for centering the component in the mold cavity.

Knock-out pins have been employed for many years to center a radial leaded electrical part in a mold during transfer molding. The rationale underlying this conventional centering method is based upon the fact that the component is supported by its leads that extend in one direction from the component body and the supposition that such a flimsily supported body will likely be deflected from its initial position by hot molding resin as it is introduced into the mold cavity. The likely directions of deflection are at right angles to the plane of the two or more radially extending leads. Two retractable coaxial knock-out pins located in the mold on opposite faces of the component are designed to extend into the cavity in directions at right angles to the leads so that they are capable of sandwiching the component during a first stage of filling the cavity with hot resin. In a second stage while the molding resin is still flowable, the pins are withdrawn from the cavity to a flush position with the cavity walls and the pressurized still flowable resin there fills the resulting voids. However, when this centering system is used in multi-cavity molds, a few of the molded components still tend to exhibit "show-throughs," i.e. the resin does not completely fill the mold cavity or the residual stresses in the component leads cause the component body to spring off center so that a portion of the component body shows through. Furthermore, the percentage of units exhibiting a show-through goes up when larger molds with more cavities are used. Thus attempts to increase the productivity of a molding press by increasing the mold capacity are quickly frustrated.

It is accordingly an object of this invention to provide a method for centering and during molding maintaining centered each of a number of radially leaded components in a cavity of a large capacity mold.

SUMMARY OF THE INVENTION

This invention is concerned with molding radially leaded electrical components. Such a radially leaded component is understood in the industry to mean one wherein two or more mutually parellel leads lying in a plane extend in the same direction away from the body of the component. The term radial leads is therefore used herein in that same sense.

The body of the component is held in a mold cavity by gripping the radial leads. By pushing a first pin through a hole in the cavity at right angles to the leads, the body is deflected substantially away from the center position in the cavity. Then after withdrawing the first pin, a second pin is pushed through a second hole in the mold in the opposite direction so as to move the body just beyond the center position and cause the body, after withdrawal of the second pin, to spring back substantially into the center position.

This procedure is capable of a much higher degree of accuracy in the centering of the body compared with the conventional techniques of sandwiching the body between the pins. The need for centering in the first place arises because the leads are not always initially straight or there is misalignment between the center of the body and the center of the mold. In the centering procedure of this invention the first pin pushes the body off center a predetermined amount to put a fixed amount of bending stress in the leads. Now when they are pushed back just beyond center a certain and predictable amount of residual stress and spring tension are imparted to the leads. Upon withdrawal of the second pin, the leads spring back a predictable amount.

In the method of the present invention, centering by the pins is accomplished prior to introduction of molding resin into the cavity. In the conventional method the body remains centered by the sandwiching pins during initial introductions of the resin. Since, in either case, the component bodies have various positions in their cavities prior to centering, a body centered by the conventional procedure has leads under an unpredictable and uncertain residual stress so that when the sandwiching pins are withdrawn, the body being encompassed in the still hot and relatively fluid resin moves due to that residual lead stress away from center.

Furthermore, it has been discovered that in the present method, after withdrawing the pins from the centered body, there is substantially no further movement caused by the introduction of the resin. It is believed that earlier theories and suppositions to the contrary, the hot resin is so fluid at initial introduction that little net force is exerted on the body. This is found to be true, even when the gate is located at one corner of the cavity tending to polarize the force on the body.

It has also been discovered that employing the method of this invention, the incidence of show-throughs remains percentage-wise very low and essentially constant when the number of mold cavities is increased. The explanation for the increasing incidence of show-throughs with increasing mold size in the conventional method is believed to result from the fact that in any multi-cavity mold, some cavities are closer than others to the source of hot pressurized resin and the closer ones fill first. The appropriate time for withdrawal of the sandwiching centering pins for the nearby cavities is inappropriately early relative to those more remote partially filled or not yet filled cavities. To retard the withdrawal of the pins will result in more reliable filling of the remote cavities but the resin there tends to be very viscous or sets hard and cannot follow the retracting pins to fill in behind them. Thus the method of this invention not only leads to a lower incidence of show-throughs from small multi-cavity molds but makes possible the simultaneous molding of a much greater number of components in a large multi-cavity mold without an accompanying increase in the incidence of show-throughs.

BRIEF DESCRIPTION OF THE DRAWINGS

FIG. 1 shows in side sectional view an open two piece mold with a radial leaded component to be molded. FIGS. 2, 3 and 4 each show in side sectional view the closed mold and component of FIG. 1 illustrating the sequential action of the centering pins for centering the component body according to this invention.

FIG. 5 shows in side sectional view the component of the above Figures after molding and removal from the mold.

FIG. 6 shows a top view of the component indicating the plane 5—5 in which the view of FIG. 5 is taken.

DESCRIPTION OF THE PREFERRED EMBODIMENTS

A solid electrolyte type tantalum capacitor body 10 is placed in a recess 12 of a bottom mold piece 13 as illustrated in FIG. 1. The capacitor leads 15 are shown resting in slots 17 provided in a recess perimeter portion 18 of the bottom mold piece 13. A top mold piece 19 is elevated above bottom piece 13.

When the split mold is closed as shown in FIGS. 2, 3 and 4, the portion 21 of top piece 19 has slots 23 that mate with slots 17 of the bottom piece 13 so as to grip the leads 15 and hold the body 10 in a closed cavity 12a. A blunt pin 25 is slidably mounted in a hole 26 in top mold piece 19. Another blunt pin 28 is slidably mounted in a hole 29 in the bottom mold piece 13 and these pins conveniently share a common axis 30.

In a first step toward centering the body 10 in mold cavity 12a, the top pin 25 is advanced into the cavity 12a a predetermined distance to push the body 10 downward so that a center of symmetry 32 (or center of gravity) of body 10 lies substantially below the plane 34 of the leads 15 as is illustrated in FIG. 2. The plane 34 of the leads is in this case the center of the mold cavity.

The top pin 25 is then withdrawn and the body 10 springs upward slightly by an amount partially determined by its original position (FIG. 1) that may have been centered, or located above center or below center. In other words, the distance by which the body 10 springs back is a function of the amount of bending of leads 15 that was effected by the prior downward advancement of upper pin 25 and the exact amount of that bending is in turn a function of the initial body position in the cavity 12a.

The bottom pin 28 is then advanced into cavity 12a by distance that will move the body 10 upward so that its center 32 will be upward relative to the plane 34 or center of the cavity 12a, as illustrated in FIG. 3.

The lower pin 28 is then withdrawn allowing the body 10 to spring back (downward) in substantially a perfectly centered position within the cavity 12a as is illustrated in FIG. 4. Since the advancement and withdrawal of pin 25 had left the body within a narrow range of predetermined positions, the advancement and withdrawal of pin 28 leaves a narrowly predetermined amount of stress in the leads 15. Therefore, when pin 28 is withdrawn the distance by which the body 10 springs back is predictable. It is thus possible to experimentally adjust the degree of advancement of pin 28 to cause the body to be exactly centered and the precision of centering is substantially unaffected by the initial position of the body 10.

The body 10 having been centered as is illustrated in FIG. 4 and the pins 25 and 28 withdrawn, a hot thermosetting resin is forced under pressure through gate 37 into the mold cavity 12a. After the resin is hardened it forms a protective housing 40 about the body 10 and a portion of the leads 15. The mold is then opened, the pins 25 and 28 are used in the conventional manner as knock-out pins, and the molded capacitor 41 is removed, appearing as illustrated in FIGS. 5 and 6.

The capacitor body 10 of this embodiment has a rectangular cross section having a nominal thickness (vertically as shown) of about 0.070 inch (1.8 mm). The thickness of the molded housing is 0.090 inch (2.3 mm). The diameter of the leads is 0.020 inch (0.5 mm) nickle wires. The sectional views are not to scale, the body thickness being shown undersize in order to provide a clearer graphic illustration of the centering technique of the invention.

It has been found that after centering no further restraint by partially advanced pins 25 and 28 is necessary to maintain the centering while the resin is being introduced to the cavity 12a. The omission of the conventional sandwich holding steps avoids an original cause for show-throughs in large capacity molds since there is no longer any requirement for synchronizing the movement of the pins 25 and 28 with the initiation of introduction of the resin to a cavity. The molding can simply proceed anytime after the centering steps.

However, such conventional holding may be employed in combination with and after execution of the centering steps of this invention without degrading the product. This result may be explained by the fact that the centering steps of this invention do not leave stresses in the leads for the reasons discussed above and the withdrawal of the holding pins may occur almost immediately after introduction of the resin, while the resin is still very fluid, without further movement of the body. This makes it possible to combine the centering steps of this invention with the temporary holding-centering steps of conventional practice in any special situation where it is found that the in-rushing resin tends to move the body off center, e.g. when the component leads are unusually fine and flimsy, A large mold having more than two hundred and fifty cavities was equipped with a first cam bar that actuates the knock-out pins in sequence relative to the transfer of the molding resin. This first cam bar provided the conventional sandwich holding of the components during molding. A second cam bar replaced the first conventional cam bar adding the pre-location steps of this invention to the holding steps. A reduction of 90% in the incidence of show-throughs was realized.

Although to date the invention has been practiced employing thermo-setting molding resins, there is every reason to believe that it will be equally effective with thermo-plastic molding resins.

What is claimed is:

1. A method for transfer molding a radial leaded electrical component comprising: supporting the body of said electrical component in a mold cavity by gripping the component leads, pushing a first pin through a hole in the mold at right angles to said leads to deflect said body substantially away from the center position in said cavity, withdrawing said first pin from said cavity, pushing a second pin through another hole in said mold in the opposite direction from said pushing of said first pin to move said body beyond said center position and withdrawing said second pin to cause said body to spring back into about said mold cavity center position.

2. The method of claim 1 additionally comprising after said withdrawing of said second pin, introducing under pressure into said mold cavity via a gate provided in a wall thereof a heated molding resin.

3. The method of claim 1 wherein said withdrawing steps include withdrawing respectively each of said first and second pins to a position whereby the pin ends are flush with the respective opposite walls of said cavity.

4. The method of claim 1 wherein said withdrawing steps include withdrawing the ends of said pins respectively to a position that forms a gap between said ends that is slightly greater than the thickness of said body, said gap being substantially centered within said cavity.

5. The method of claim 4 additionally comprising introducing said resin while restraining said body in said gap and shortly thereafter, prior to said resin becoming essentially unflowable, retracting said pins to a flush position with respect to the walls of said cavity to fill the spaces created therein by said retracted pins.

6. A method for transfer molding a radial leaded electrical component including placing the body of said component in a recess of a first piece of a split mold with said radial leads extending from said body mutually parallel in slots provided therefor in the perimeter of said mold, placing at least a second piece of said split mold in mating relationship with said first piece to form a cavity and to grip said leads and entomb said component body supported by said leads within said cavity, and introducing under pressure into said cavity a hot liquid molding resin, opening said mold and removing said encapsulated component, wherein the improvement comprises:

after said entombing of said body and prior to said introducing said hot resin, pushing perpendicularly to the plane of said leads a first blunt pin through a hole provided therefor in said first mold piece to push said body substantially beyond the center position of said cavity, withdrawing said first pin, then pushing in the opposite direction from said first pin a second blunt pin through a hole provided therefor in another piece of said mold toward said body to deflect said body beyond said center position, and withdrawing said second pin to cause said leads-supported body to spring back into said center position.

7. The method of claim 6 wherein said removing said encapsulated component includes ejecting the molded component by means of advancing said pins inward toward said recess.

* * * * *